Aug. 14, 1945.   C. F. ROBIE   2,382,098
WELDING RING
Filed March 31, 1943
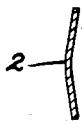
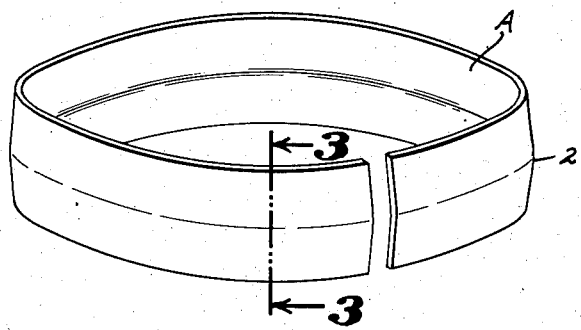
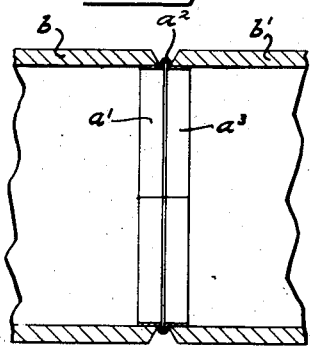
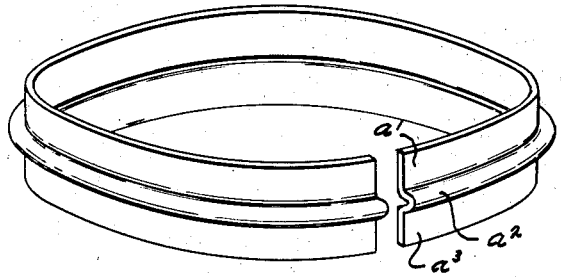
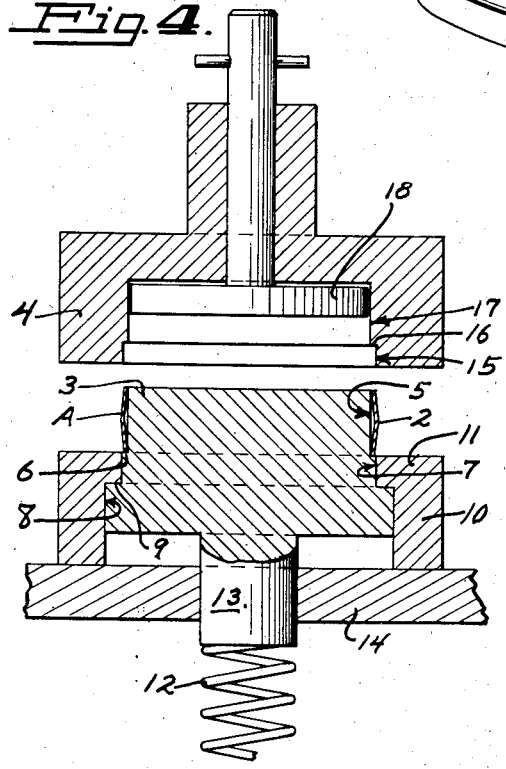
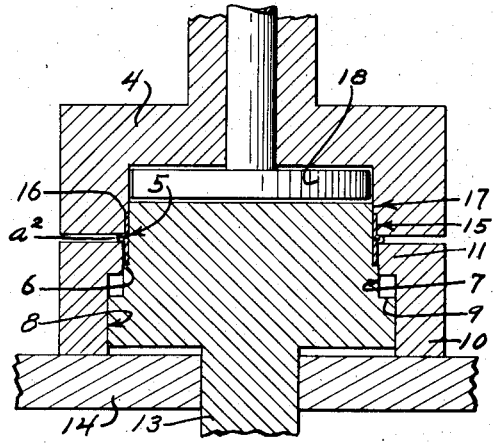
INVENTOR,
CHARLES F. ROBIE.
BY
Chas. E. Townsend.
ATTORNEY.

Patented Aug. 14, 1945

2,382,098

UNITED STATES PATENT OFFICE 2,382,098

WELDING RING

Charles F. Robie, Alameda, Calif., assignor to Hawkins-Hawkins Co., San Francisco, Calif., a partnership consisting of John H. Hawkins and Landona Hawkins Application March 31, 1943, Serial No. 481,203

1 Claim. (Cl. 285—111)

This invention relates to welding rings for use in welding pipe, and to a method of manufacturing the same.

In uniting pipe sections by welding, it is common practice to insert a metal sleeve, having an external, centrally-disposed flange, into the ends of two adjacent sections, with the pipe ends abutting against the peripheral central flange. The purpose of the flange sleeve is to bridge the space between the adjacent ends of two pipes, with the flange partially filling the intervening space and preventing any spelter or slag from the welding operation forming icicles in the pipe line and retarding fluid flow or from the slag drops and particles entering the pipe and subsequently interfering with the proper functioning of any valves in the line.

These sleeves are known as welding rings. Heretofore, the beaded rings have been formed by rolling or by turning on a lathe. In the past, the welding ring beads were not "folded" by means of stamping, and, therefore, prior rings developed strains in the ring metal which curled the edges of the ring portions within the pipes inwardly away from the adjacent walls of the pipes when welding heat was applied thereto.

One of the important advantages of the present ring invention is that when it is positioned in adjacent pipe ends and welding heat is applied thereto, the ends of the ring portions within the pipes curl radially outwardly against the inner peripheral surfaces thereof and adhere thereagainst, due to the peculiar tension or strains in the ring metal developed by the stamping process. The completed weld retains the rings in such position and consequently the amount of projection of the ring into the pipe interior is kept to a minimum.

The present invention comprehends a simpler, cheaper, quicker method of forming these rings by a novel stamping method, as will later be described.

Referring to the drawing:

Fig. 1 illustrates a circular uncrimped band or sleeve of spring steel ready for insertion into the press by which the finished ring is formed.

Fig. 2 shows the completed welding ring.

Fig. 3 is a section on line III—III of Fig. 2.

Fig. 4 is a diagrammatic section of the dies, in open position, by which the ring is formed, with the uncrimped band in position on its mandrel.

Fig. 5 is a similar view, with the dies closed, after the ring has been formed.

Fig. 6 shows the manner of use of a welding ring within two adjacent pipe ends, before welding.

Referring to the finished welding ring, as shown in Fig. 2, it comprises three coaxial sections $a'$, $a^2$, $a^3$; the central section $a^2$ constituting an external bead joining the adjacent cylindrical sections $a'$ and $a^3$, which latter are adapted to telescope with the adjacent ends of two pipe sections $b$ and $b'$ as shown in Fig. 6. The invention pertains especially to a novel method of forming the bead $a^2$.

In practice, a band or sleeve of steel strip of suitable length, width and gauge is formed as in Fig. 1 into a split ring A, with the ends separated sufficiently to give the desired spring effect. The gauge and width of the band vary with the size or diameter of the finished ring.

Assuming a ring of four-inch diameter, it is customary to employ a strip of sixteen-gauge steel of approximately one inch in width and form it into a ring band and with a continuous circumferential outward bulge 2, so that in cross section at any point the band is slightly convexed outwardly. This gives the ring a set to its spring action so that its tendency to spring open or straighten is substantially lessened or overcome and a more uniform product assured.

To convert the band A to its finished form shown in Fig. 2, a set of special dies is provided, in which there is a male die 3 and a complementary female die 4 mounted in a suitable press of conventional design, the details of which latter are not shown. Die 3 has a turned down portion 5 at its upper end of a diameter and length corresponding to the inside diameter and width of the ring A, which latter is adapted to seat on a narrow ledge 6 of the same depth as the thickness of the band. Below portion 5 is a slightly enlarged section of die 3, as shown at 7, which is of a diameter equivalent to the outside diameter of the ring band A, allowing for the slightly added diameter of the convexity 2.

The portion of die 3 below section 7 is again enlarged, as at 8, with a shoulder 9 connecting the top of section 8 with the bottom end of section 7. Section 8 has a sliding fit with a stationary base member 10 which, in turn, has an inwardly projecting section 11 constituting a stop to the upward movement of the shoulder 9.

Thus it is seen that the die 3 comprises essentially a stepped member with sections of successively varying diameters 5, 7 and 8 operative in a suitable guide member 10. Die 3 cushions on an appropriate resilient support, indicated here as a stiff spring 12 which abuts against the suitably guided stem 13 of the die. The downward movement of the die 3 is limited by contact with the bed plate 14. The length of the section 7 of the die 3 and the length of movement of the die itself are carefully proportioned to size, width and gauge of the ring to be made and correspond to the width of a section $a'$ or $a^3$ of the finished ring of Fig. 2 or Fig. 6.

The complementary or female die 4 has an annular cavity with an outer wall portion 15 of the same diameter as the outside diameter of the ring band A when the latter is positioned on section 5 of die 3. The depth of the ring-wall 15 is delimited by a shoulder 16, which depth is equal to the width of a section $a'$ or $a^3$ of the finished ring of Fig. 2 or Fig. 6. The cavity in die 4 has a reduced portion above the shoulder 16, the outer wall 17 of which is of a diameter such as to provide a sliding fit with the mandrel portion 5 of die 3 when the parts are moved into telescoping relation.

In operation, a ring-band A is first formed. With the dies 3 and 4 in open position in a suitable press the band is slipped over the mandrel portion 5 of the die 3 with the band resting on the ledge 6 and with the upper edge of the band flush with the top of the die 3. The die member 4 is then brought down over the mandrel and band until the shoulder 16 of the wall 15 of die 4 rests on top of the band. Until now the die 3 has remained stationary against the resistance of the underneath cushion, represented by spring 12. With the parts in this position, the upper portion of the band, corresponding to an area represented by a section $a'$ of the band (Fig. 2), is surrounded and supported inside and out between the upper part of mandrel 5 and the outer telescoping wall 15 of die 4 so that the band can not buckle in that portion of the band as compression continues.

Then as die 4 continues its down stroke, it pushes die 3 and band A downward until the bottom end of band A comes to a position coincident with the plane of the shoulder 11. With the dies in this position the portion of the band $a^3$ (Fig. 2) is snugly embraced between the lower part of mandrel 5 and the adjacent wall 11ª of section 11. It is important to note that at no time does die 4 contact the top of part 11, forming part of the lower die assembly. In fact, the descent of die 4 stops short of the annulus 11 by a distance sufficient for the central unsupported part of the band to expand and stretch and thus to form the fold which eventually becomes the bead portion $a^2$ of the ring of Figs. 2 and 6.

Having thus moved the dies to the position by which this bead is formed, the pressure is released to return the parts to normal open position and the finished ring is removed in readiness for repetitive actions, the release of the ring from die 4 being facilitated by a knockout plate 18.

I claim:

An article of manufacture comprising a welding ring for aligning and coupling adjacent pipe ends, said welding ring comprising a split ring member slightly convex in cross section and a circumferential central fold in the form of a continuous bead formed as a part of said split ring by endwise stamping pressure, thereby setting up strains in said bead and said split ring whereby the ends of said welding ring expand outwardly when said strains are relieved by heating during the operation of welding said welding ring to adjacent pipe ends.

CHARLES F. ROBIE.